United States Patent [19]
Lesesky et al.

[11] Patent Number: 6,089,588
[45] Date of Patent: Jul. 18, 2000

[54] APPARATUS AND METHOD FOR CONTROLLING POWER TO INTERIOR TRAILER FUNCTIONS OF A HEAVY DUTY VEHICLE

[75] Inventors: Alan Lesesky, Charlotte, N.C.; Robert Weant, Rock Hill, S.C.; Bruce Purkey, Rogers, Ark.

[73] Assignees: Purkey's Fleet Electrics, Inc., Rogers, Ark.; Vehicle Enhancement Systems, Inc., Rock Hill, S.C.

[21] Appl. No.: 09/165,751

[22] Filed: Oct. 2, 1998

[51] Int. Cl.[7] ........................................ B60D 1/62
[52] U.S. Cl. ...................... 280/422; 280/446.1; 362/485; 49/13
[58] Field of Search ................................ 280/422, 446.1; 362/485, 488, 94, 802; 49/13, 14; 296/146.1

[56] References Cited

U.S. PATENT DOCUMENTS

| | | | |
|---|---|---|---|
| 3,497,707 | 2/1970 | Stewart | 362/485 |
| 4,334,388 | 6/1982 | Kambic | 49/14 |
| 4,872,095 | 10/1989 | Dubak et al. | 362/100 |
| 5,573,327 | 11/1996 | Dealey et al. | 362/80 |
| 5,602,526 | 2/1997 | Read | 340/457 |
| 5,678,914 | 10/1997 | Dealey et al. | 362/32 |
| 5,775,712 | 7/1998 | Link et al. | 280/442 |
| 5,975,713 | 11/1999 | Brothers | 362/155 |

*Primary Examiner*—J. J. Swann
*Assistant Examiner*—Michael Cuff
*Attorney, Agent, or Firm*—Allen, Dyer, Doppelt, Milbrath & Gilchrist, P.A.

[57] ABSTRACT

An apparatus and methods are provided for controlling power to interior functions of a trailer of a heavy duty vehicle. The apparatus preferably includes a vehicle trailer adapted to be connected to a heavy duty vehicle and having an interior cargo storage chamber and at least one door for providing access to the interior cargo storage chamber, a power supply connected to the trailer, at least one light source connected to the power supply and mounted within the interior cargo storage chamber of the trailer, and a light controller mounted to the trailer, connected to the power supply and the light source, and responsive to open and closed positions of the at least one door for controlling the power to the at least one light during predetermined periods of time when the at least one door of the trailer is in an open position and a closed position so that when the at least one door is in the open position the at least one light is in an on position having power supplied thereto and when the door is in a closed position the power is prevented from being supplied to the at least one light and thereby cause the at least one light to be in an off position.

60 Claims, 6 Drawing Sheets

APPARATUS AND METHOD FOR CONTROLLING POWER TO INTERIOR TRAILER FUNCTIONS OF A HEAVY DUTY VEHICLE

FIELD OF THE INVENTION

The present invention relates to the field of heavy duty vehicles and, more particularly, to controlling power in such vehicles.

BACKGROUND OF THE INVENTION

Over the years, the heavy duty vehicle industry has used tractor and trailer combinations to transport cargo over the roadways to various desired destinations. The tractors and trailer are conventionally mechanically coupled together so that the tractor efficiently and effectively pulls the trailer. Often, one or more additional trailers are also mechanically coupled to another trailer so that only one tractor pulls a plurality of trailers. With these trailers, however, various schemes have been developed to provide power to the trailers for various uses such as those associated with lighting, communications, temperature control, and other functions.

The trucking industry has conventionally used an auxiliary pin (i.e., pin no. 7) in a known Society of Automotive Engineering ("SAE") J560 standard seven conductor electrical connector to supply power from the tractor to the trailer for many applications, including interior trailer functions. Trucking fleets have often used the auxiliary pin to activate/deactivate the trailer dome lights through a toggle switch located within the tractor. Also, there has now been a federal industry mandate that requires all trailers to be equipped with an automatic braking system ("ABS"). New recommended practices and standards in the industry, however, now require that the auxiliary pin be used as a switched power (tractor key switch) for the trailer ABS. Thus, this auxiliary pin can no longer be used for the toggle switch that controls the trailer dome lights. Consequently, the manual toggle switch may have to be relocated to the trailer interior.

When providing lighting to the interior of a trailer, however, the driver or other personnel are often required to open the door of a trailer, enter the trailer, and turn on at least one switch, e.g., a manual toggle switch, to one or more of the lights within the trailer, e.g., a trailer dome light, which illuminate the interior of the trailer. Often when the trailer door is closed again, such as after unloading cargo, the switch to the light(s) can accidentally remain in the on position or be accidentally switched to the on position such as by shifting trailer cargo. Leaving the light(s) in the on position such as during transit can create a potential fire hazard and can cause power or power distribution problems, as well as other problems, associated with the tractor and/or trailer.

SUMMARY OF THE INVENTION

With the foregoing in mind, the present invention advantageously provides an apparatus and methods for controlling power to trailer functions such as interior dome lights, back up lights, and/or a back up alarm, especially where the trailer includes an automatic braking system. The present invention also advantageously provides an apparatus and methods for controlling illumination of trailer lights in a heavy duty vehicle which effectively addresses the potential fire hazard, power distribution, and other problems that can be associated with, for example, leaving interior trailer lights in an on position for extended periods of time and/or during transit. The present invention further advantageously provides a warning for a driver or other operators of a heavy duty vehicle that the interior trailer lights are on or that one or more doors to the trailer are in an open position.

More particularly, the present invention provides a combination trailer and apparatus for controlling power to interior functions of the trailer of a heavy duty vehicle. The combination preferably includes a vehicle trailer adapted to be connected to a heavy duty vehicle and having at least one trailer door for providing access to an interior chamber of said trailer, power supplying means, e.g., preferably provided by a power supply, connected to the trailer for supplying power to trailer functions such as interior dome lights positioned in an interior cargo storage chamber of the trailer, light illuminating means, e.g., preferably provided by at least one light source, connected to the power supplying means for providing light illumination, and light power controlling means, e.g., preferably provided by a light power controller, mounted to the trailer, connected to the power supplying means and the light illuminating means, and responsive to open and closed positions of the at least one trailer door for controlling the power to the light illuminating means during predetermined periods of time when the at least one trailer door is in an open position and a closed position so that when the at least one trailer door is in the open position the light illuminating means is in an on position having power supplied thereto and when the at least one trailer door is in a closed position power is prevented from being supplied to the light illuminating means and thereby cause the light illuminating means to be in an off position.

The present invention also provides an apparatus for controlling power to interior functions of a trailer of a heavy duty vehicle and which preferably includes at least one light source connected to a power supply of a trailer and a light controller positioned to be mounted to a trailer, connected to the power supply of the trailer and the at least one light source, and responsive to open and closed positions of at least one door of the trailer for controlling the power to the at least one light source during predetermined periods of time when the at least one trailer door is in an open position and a closed position so that when the at least one trailer door is in the open position the at least one light source is in an on position having power supplied thereto and when the at least one trailer door is in a closed position power is prevented from being supplied to the at least one light source and thereby cause the at least one light source to be in an off position.

In one embodiment, for example, the apparatus can include one or more trailer doors having a magnet connected to a portion thereof and a switching sensor such as a solid state switch, e.g., a reed switch, preferably mounted to an interior wall of the trailer so that it will not be readily visible by those outside the trailer to prevent vandalism and theft and connected to the power line which receives power from the tractor, e.g., shared power from auxiliary pin no. 7 which shares with the ABS of the trailer. When the trailer door(s) swings open so that the portion of the door having the magnet mounted thereto is adjacent the wall having the switching sensor, the switching sensor senses the presence of the magnet on the door and switches to a position to supply power to the light source, e.g., a dome light. In turn, when the door is pulled away from the wall and the magnetic field created by the magnet is removed, the switching sensor switches to remove or prevent power from being supplied to the light source.

The present invention additionally advantageously provides a method for controlling power to a light source associated with a trailer of a heavy duty vehicle. The method preferably includes the steps of providing a vehicle trailer connected to a tractor and having at least one trailer door for providing access to an interior chamber of the trailer, supplying power to a power line of the trailer, providing at least one light source connected to the power line of the trailer, and controlling the illumination of the at least one light source responsive to open and closed positions of the at least one trailer door during predetermined periods of time when the at least one trailer door is in an open position and a closed position so that when the at least one trailer door is in the open position the at least one light source is in an on position having power supplied thereto and when the at least one trailer door is in a closed position power is prevented from being supplied to the at least one light source and thereby cause the light source to be in an off position.

The present invention further provides a method for controlling illumination of a light source associated with a trailer of a heavy duty vehicle. The method preferably includes illuminating a light source connected to a trailer responsive to open and closed positions of at least one trailer door of the trailer during predetermined periods of time when the at least one trailer door is in an open position and a closed position so that when the at least one trailer door is in the open position the at least one light source is in an on position having power supplied thereto and when the at least one trailer door is in a closed position power is prevented from being supplied to the at least one light source and thereby cause the light source to be in an off position.

The apparatus and methods of the present invention, for example, can advantageously share the constant power source supplied by the auxiliary pin number 7 which supplies power to the automatic braking system of the trailer and still control the operation of the interior dome lights or other trailer functions. The apparatus and methods also meet the recommended practices of the heavy duty vehicle industry, e.g., trucking industry, and reduces the potential for human error or negligence. The dome lights, for example, automatically shut off when the doors of the trailer are closed prior to transit. The apparatus and methods additionally eliminate the need for a manual toggle switch which can inadvertently be activated by shifting trailer cargo.

BRIEF DESCRIPTION OF THE DRAWINGS

Some of the objects and advantages of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

FIGS. 1–3 and 5A–6C illustrate a combination trailer 15 and apparatus 30 for controlling power to interior functions of the trailer 15 of a heavy duty vehicle, e.g., a tractor 10 having at least one trailer 15 coupled thereto. As illustrated, the combination includes a vehicle trailer 15 adapted to be connected to or become a portion of a heavy duty vehicle and having at least one trailer door, e.g., a pair of rear doors 17, 18, one rear door 19, or other configurations, for providing access to an interior cargo storage chamber 21 of the trailer 15. The apparatus 30 of the combination preferably includes power supplying means, e.g., preferably provided by a power supply 32, e.g., one or more batteries, which includes a power line 33, connected to the trailer 15 for supplying power to trailer functions and light illuminating means, e.g., preferably provided by at least one light source 35, connected to the power line 33 of the power supply 32 for providing light illumination.

The apparatus 30 further preferably includes light power controlling means, e.g., preferably provided by a light power controller 50, mounted to the trailer 15, connected to a power line 33 of the power supply 32 and the at least one light 35, and responsive to open and closed positions of the at least one trailer door 17, 18 for controlling the power to the at least one light 35 during predetermined periods of time when the at least one trailer door 17, 18 is in an open position and a closed position so that when the at least one trailer door 17, 18 is in the open position the at least one light 35 is in an on position having power supplied thereto and when the at least one trailer door 17, 18 is in a closed position power is prevented from being supplied to the at least one light 35 and thereby cause the at least one light 35 to be in an off position.

Figures 5A, 5B, 5C:
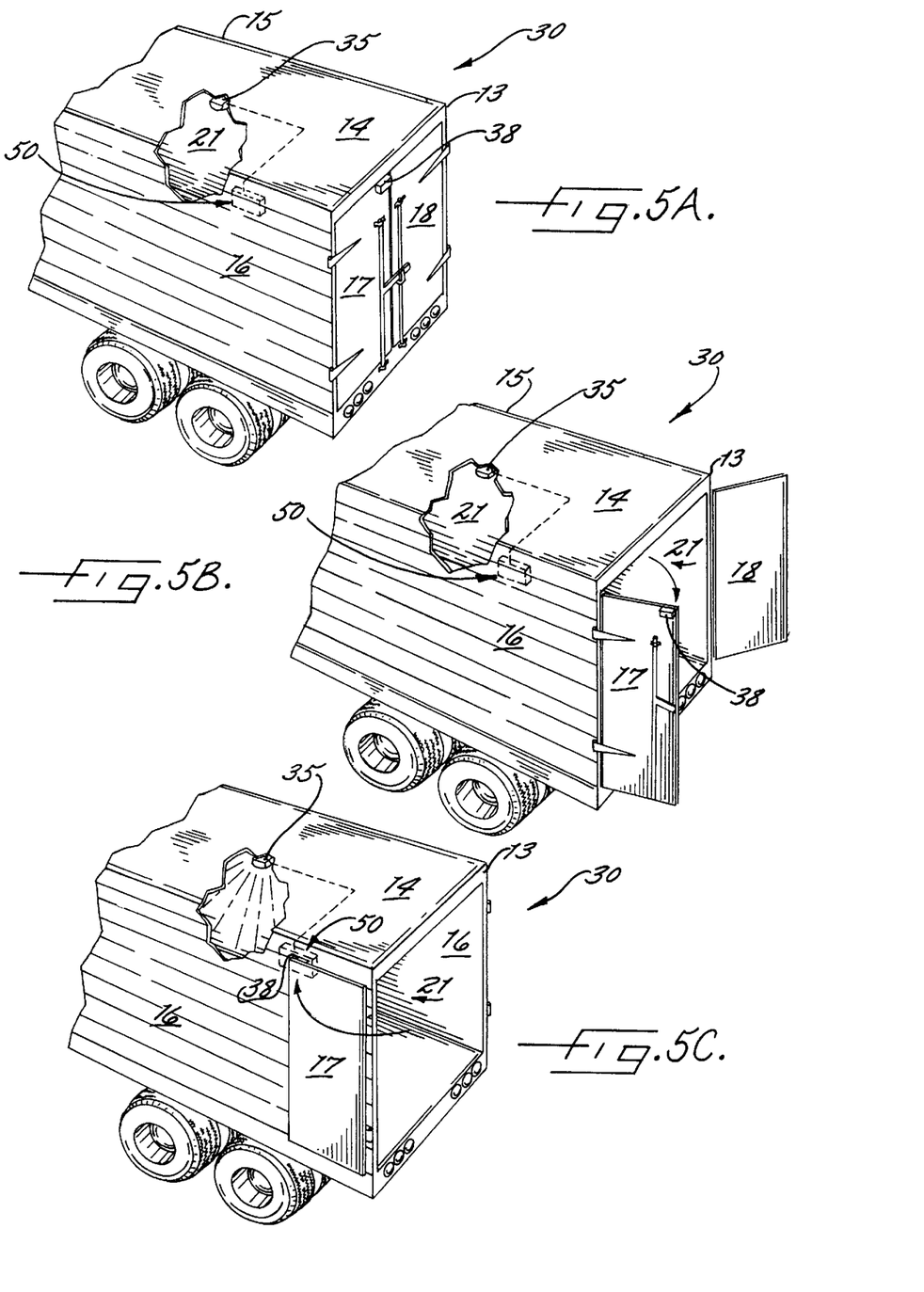
FIG. 5A is a fragmentary perspective view of a trailer having an apparatus for controlling power to interior trailer functions and having the doors to the trailer in a closed position according to a first location of the present invention.
FIG. 5B is a fragmentary perspective view of a trailer having an apparatus for controlling power to interior trailer functions and having the doors to the trailer in a partially-opened position according to a first location of the present invention.
FIG. 5C is a fragmentary perspective view of a trailer having an apparatus for controlling power to interior trailer functions and having the doors to the trailer in a fully-opened position according to a first location of the present invention.
Figures 6A, 6B, 6C:
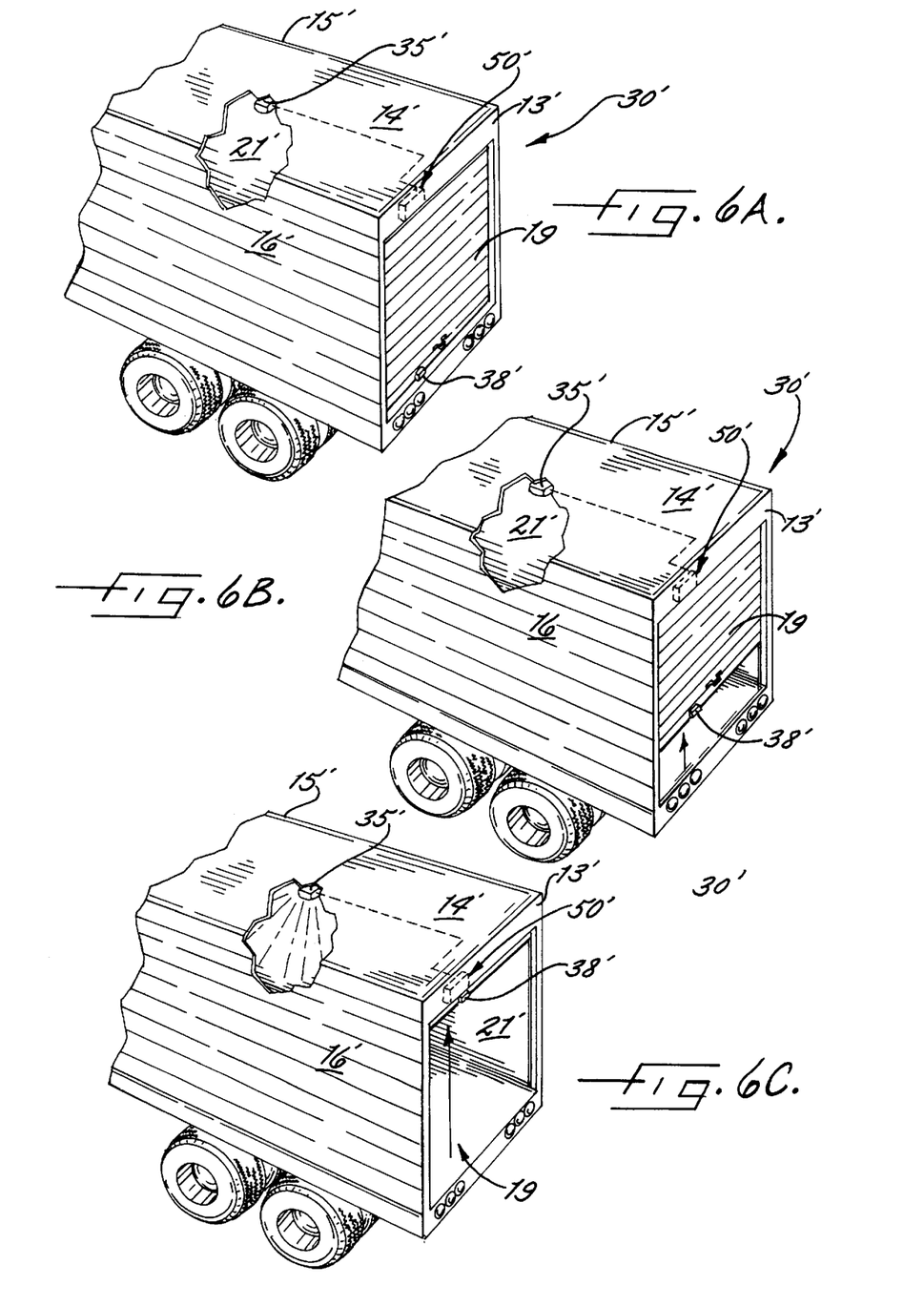
FIG. 6A is a fragmentary perspective view of a trailer having an apparatus for controlling power to interior trailer functions and having the doors to the trailer in a closed position according to a second location of the present invention.
FIG. 6B is a fragmentary perspective view of a trailer having an apparatus for controlling power to interior trailer functions and having the doors to the trailer in a partially-opened position according to a second location of the present invention.
FIG. 6C is a fragmentary perspective view of a trailer having an apparatus for controlling power to interior trailer functions and having the doors to the trailer in a fully-opened position according to a second location of the present invention.

In one embodiment, as perhaps best shown in FIGS. 5A–5C, the apparatus 30 can include one or more trailer doors 17, 18 having a magnet 38 connected to a portion thereof, e.g., an exterior wall, and a switching sensor 42 such as a solid state switch, e.g., a reed switch, preferably mounted to an interior wall, e.g., preferably an interior side wall 16, an interior end wall 13, or an interior top wall 14, of the trailer 15 so that it will not be readily visible by those outside the trailer to prevent vandalism and theft. The switching sensor 42 is also connected to the power line 33 which receives power from the tractor 10, e.g., shared power from auxiliary pin no. 7 which shares with the ABS 55 of the trailer 15. An ABS system for trailers are well known to those skilled in the art, and for brevity will not be described extensively further herein. The power line 33 preferably supplies about 12 volts to the light controller 50 and the ABS or ABS controller 55.

When the trailer door(s) 17, 18 swings open so that the portion of the door 17 having the magnet 38 or other magnetic material mounted thereto is adjacent the wall 16 having the switching sensor 42, the switching sensor 42 senses the presence of the magnet 38 on the door 17 and switches to a position to supply power to the light source, e.g., a dome light 35. As described, the open position (see FIG. 5C) of the trailer door 17 preferably is a fully open position whereby the trailer door 17 is positioned closely adjacent a sidewall 16 of the trailer 15. Alternatively, in a different embodiment of a trailer door 19 for example, the trailer door 19 is in a fully open position (see FIG. 6C) whereby a lower portion of the trailer door is positioned closely adjacent a top region 14 of the trailer 15. In turn, when the door 17 is pulled away from the wall 16 toward a closed position (see FIGS. 5A–5B and 6A–6B) and the magnetic field created by the magnet 38 is removed, the switching sensor 42 switches to remove or prevent power from being supplied to the light source 35.

Figure 1:
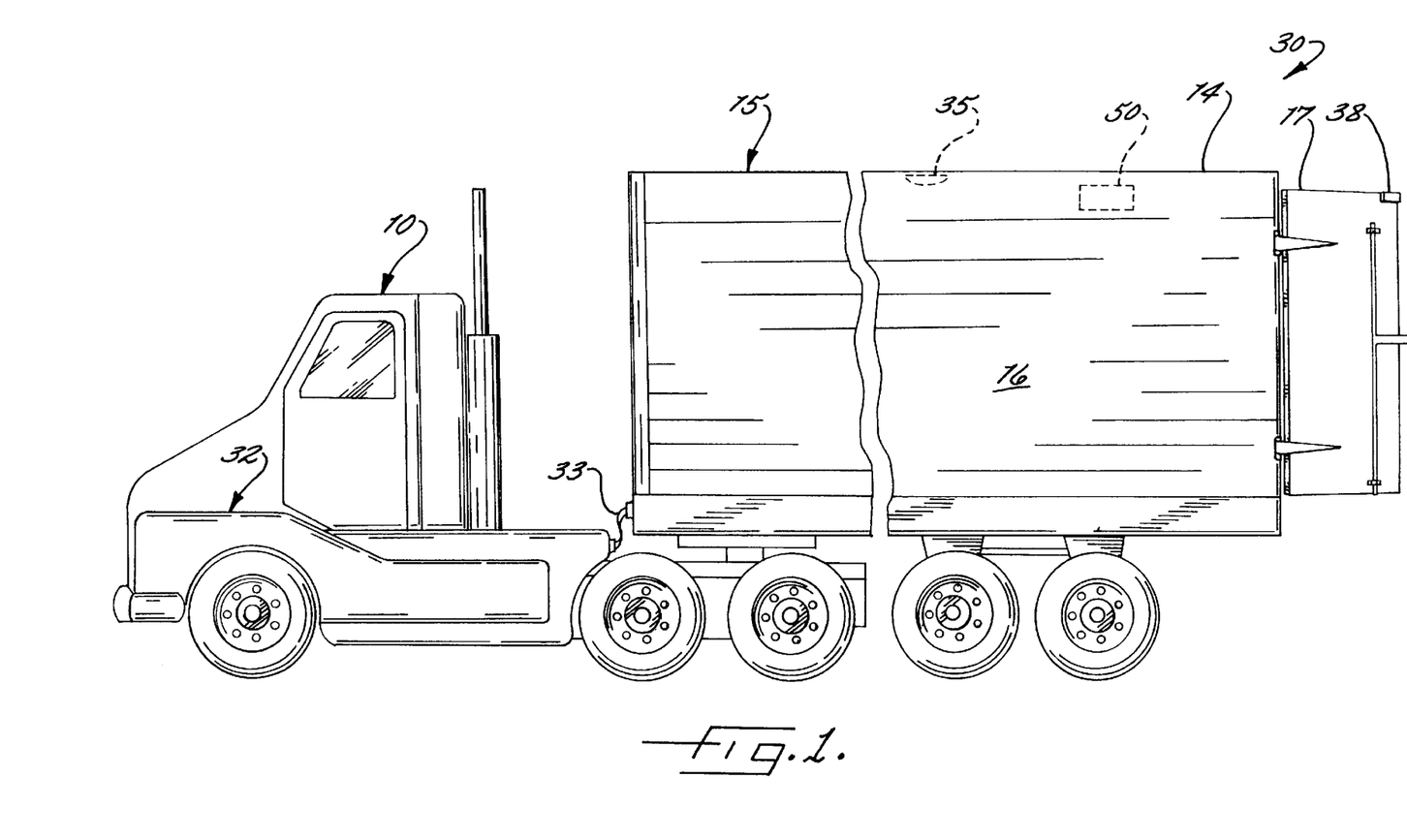
FIG. 1 is a side elevational view of a tractor and a trailer coupled thereto having an apparatus for controlling power to interior trailer functions according to the present invention.
Figure 2:
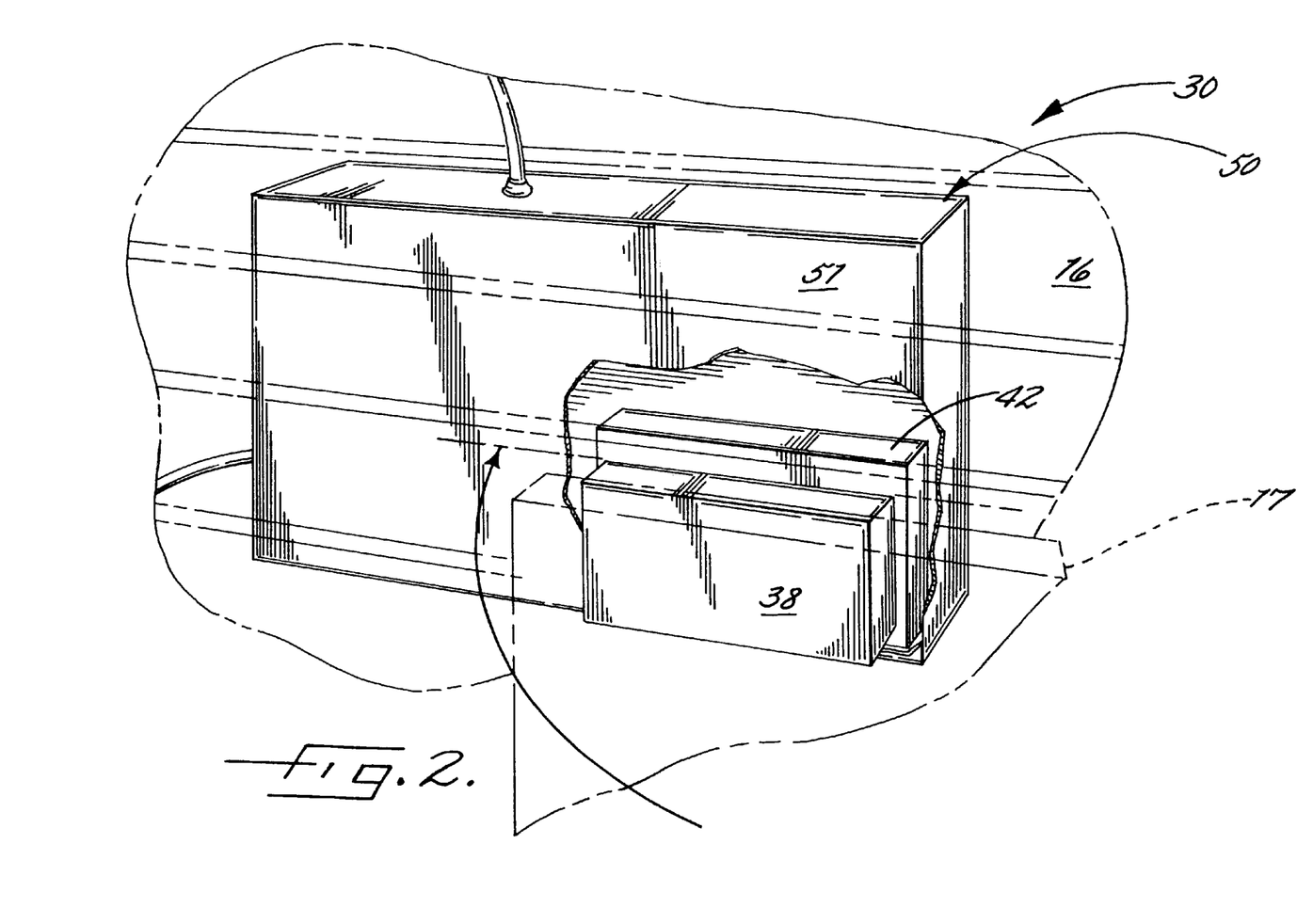
FIG. 2 is a perspective view of an apparatus for controlling power to interior trailer functions according to the present invention.
Figure 3:
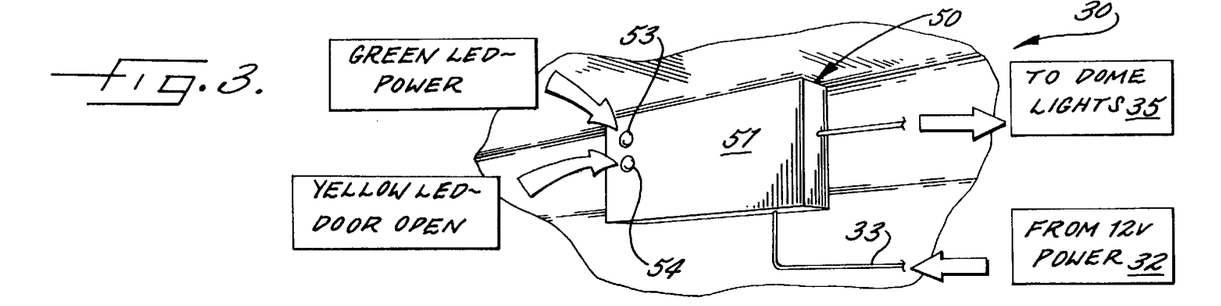
FIG. 3 is a perspective view of an apparatus for controlling power to interior trailer functions according to the present invention.
Figure 4:
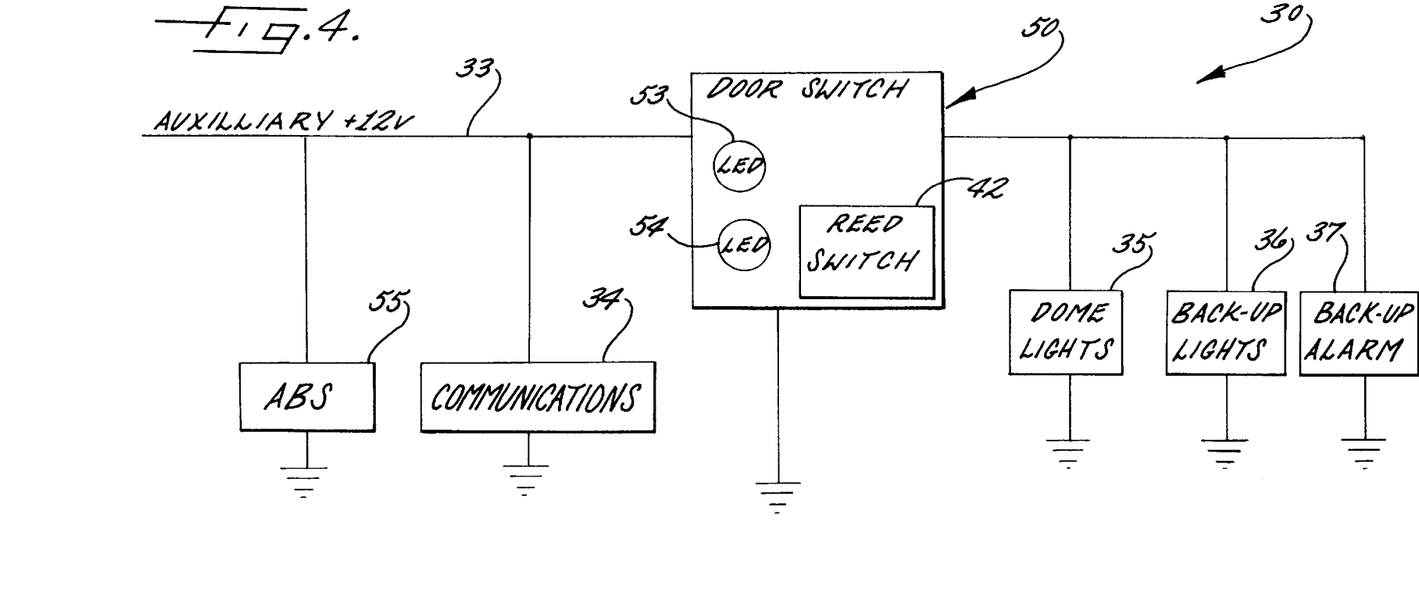
FIG. 4 is a schematic view of an apparatus for controlling power to interior trailer functions according to a first embodiment of the present invention.

As perhaps best illustrated in FIGS. 2–4, the light power controller 50 also preferably includes a housing 51 having the switching sensor 42 positioned therein and a plurality of function indicators 53, 54 connected thereto. The switching sensor 42 of the light controller 50 preferably is a solid state relay device such as a reed switch, a Hall-effect device, or a magneto-resistive device as understood by those skilled in the art. The relay device 42 switches positions when a magnetic field is initiated from the magnet 38 when positioned adjacent or closely adjacent the relay device (see FIG. 2). The plurality of function indicators 53, 54 include a first function indicator 53 for indicating the presence of power being supplied to the light controller 50 and a second function indicator 54 for indicating the position of the trailer door(s) 17, 18.

In alternative embodiments, the combination and/or apparatus 30 can further advantageously include at least one back up light 36 connected to the trailer 15 and to the light power controller 50 so that the light power controller 50 further controls power being supplied to the at least one back up light 36. As understood by those skilled in the art, the back up light(s) 36, for example, provide an illumination path for the driver in backing up the trailer 15 in the reverse direction. Additionally, at least one back up alarm 37, e.g., a horn, beeper, or other audible indicator, can be connected to the trailer 15 and to the light power controller 50 to provide a warning when the trailer 15 is being backed up in a reverse direction. The light power controller 50' likewise further controls power being supplied to the at least one back up alarm 37. Further, the power line 33 can also have one or more a data communication devices 34 connected thereto for providing data communications along the power line 33 as a data communications carrier. Such power line carrier data communications devices are known and understood by those skilled in the art, but can advantageously also share this power line 33 with the ABS and the light power controller 50.

Figures 7, 8:
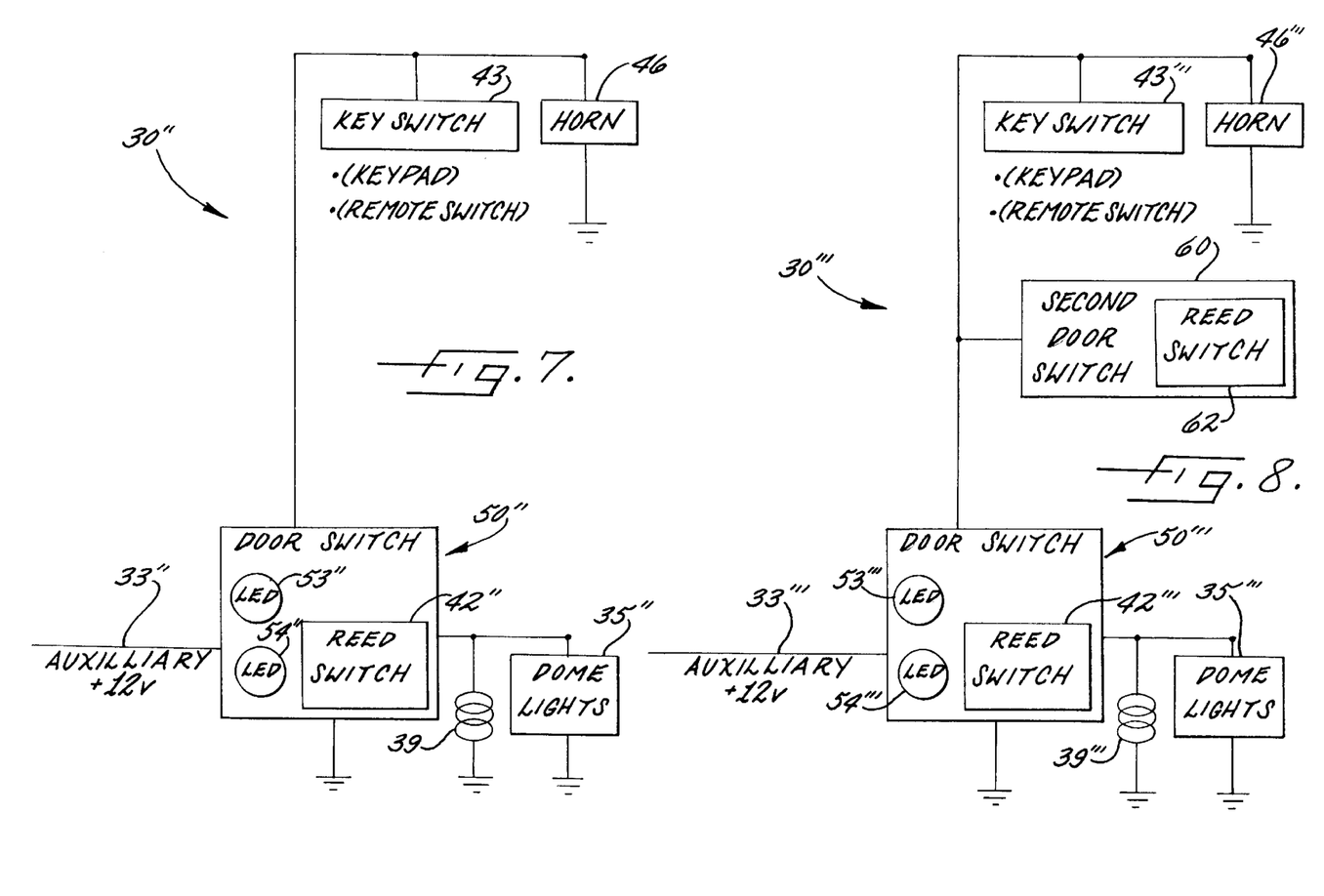
FIG. 7 is a schematic view of an apparatus for controlling power to interior trailer functions according to a second embodiment of the present invention.
FIG. 8 is a schematic view of an apparatus for controlling power to interior trailer functions according to a third embodiment of the present invention.

As shown in FIGS. 7–8, other embodiments of the apparatus 30", 30'" for example, can include an ignition switch 43, 43'" associated with an attempt to ignite an engine of the tractor 10 and a warning device 46, 46'" connected to the ignition switch 43 and the light power controller 50 for providing a warning when the ignition switch 43 is activated and the at least one trailer door 17 is in an open position. The ignition switch 43 advantageously include at least one of the following: a key switch, a key pad, a remote switch, a remote control device, an ignition button, or other ignition switch, as understood by those skilled in the art. The warning device 46 preferably includes at least one of the following: a horn, a warning light, or a display indicator. The ignition switch 43 and the warning device 46 are preferably mounted in the cab of the tractor 10 so that when the driver attempts to ignite the engine by inserting the key into the ignition switch 43, the warning device 46 sounds or indicates so the driver readily realizes that one or more doors 17, 18, 19 to the trailer 15 are in a fully open or slightly open position. The apparatus 30", 30'" also preferably includes a current source 39, 39'" for either sinking or supplying current to the circuit which includes or is connected to the power line 33", 33'" as illustrated (FIGS. 7–8).

According to the present invention, the light power controlling means can also be a first light controller 50'", and the at least one trailer door can be first and second trailer doors 17, 18 of the trailer 15. At least a second light controller 60, preferably also including a second switching sensor 62, also can be mounted to the trailer 15, connected to the ignition switch 43'", the warning device 46'", the first light controller 50'", and the power line 33'", and responsive to open and closed positions of the second trailer door 18 for providing a warning when the ignition switch 43'" is activated and the second trailer door 18 is in an open position. Alternatively, a controller 50'" could be connected to one or more doors of the cab so that a warning is provided to the driver when the cab door is opened, i.e., instead or in conjunction with the ignition switch, if the trailer door is open.

As illustrated in FIGS. 1–8, the present invention also provides a method for controlling power to a light source 35 associated with a trailer 15 of a heavy duty vehicle. The method preferably includes providing a vehicle trailer 15 connected to a tractor 10 and having at least one trailer door for providing access to an interior chamber 21 of the trailer 15, supplying power to a power line 32 of the trailer 15, providing at least one light source 35 connected to the power line 32 of the trailer 15, and controlling the illumination of the at least one light source 35 responsive to open and closed positions of the at least one trailer door 17 during predetermined periods of time when the at least one trailer door 17 is in an open position and a closed position so that when the at least one trailer door 17 is in the open position the at least one light source 35 is in an on position having power supplied thereto and when the at least one trailer door 17 is in a closed position power is prevented from being supplied to the at least one light source 35 and thereby cause the light source 35 to be in an off position.

The step of controlling the illumination preferably includes illuminating the at least one light source 35 to the on position when a portion of the at least one trailer door 17 is positioned adjacent a switching sensor 42 mounted to the trailer 15 and in the open position and preventing power from being supplied to the at least one light source 35 for the off position when the portion of the at least one trailer door 17 is positioned away from the switching sensor 42 and in a closed position.

The switching sensor 42 can be mounted to an interior side wall 16, an interior end wall 13, or an interior top wall 14 of the trailer 15, and the method can further include mounting at least one magnet 38 to an exterior of the at least one trailer door 17. The switching sensor 42, for example, can include a relay device, and the method further include initiating a magnetic field when a portion of the at least one trailer door 17 is positioned adjacent the relay device.

The open position of the at least one trailer door 17 is a fully open position whereby the trailer door 17 is positioned adjacent a sidewall 16 of the trailer 15 (see FIGS. 5A–5C). Alternatively, for example, the at least one trailer door 19 is in a fully open position whereby a lower portion of the trailer door 19 is positioned adjacent a top region 14 of the trailer 15 (see FIGS. 6A–6C).

The method can still further include attempting to ignite an engine of a tractor 10 connected to the trailer 15 and providing a warning responsive to the attempt to ignite the engine when the at least one trailer door 17 is in an open position.

The present invention also includes a method for controlling illumination of a light source 35 associated with a trailer 15 of a heavy duty vehicle. This method preferably includes illuminating a light source 35 connected to a trailer 15 responsive to open and closed positions of at least one trailer door 17 of the trailer 15 during predetermined periods of time when the trailer door 17 is in an open position and a closed position so that when the trailer door 17 is in the open position the light source 35 is in an on position having power supplied thereto and when the trailer door 17 is in a closed position power is prevented from being supplied to the light source 35 and thereby cause the light source 35 to be in an off position.

The step of illuminating the at least one light source 35 to the on position preferably includes positioning a portion of the at least one trailer door 17 adjacent a switching sensor 42 mounted to the trailer 15 and in the open position and preventing power from being supplied to the light source 35 for the off position when the portion of the trailer door 17 is positioned away from the switching sensor 42 and in a closed position.

As with the other method, the switching sensor 42 can be mounted to an interior side wall 16, an interior end wall 13, or an interior top wall 14 of the trailer 15, and the method can further include mounting at least one magnet 38 to an exterior of the at least one trailer door 17. The switching sensor 42, for example, can include a relay device, and the method further include initiating a magnetic field when a portion of the trailer door 17 is positioned adjacent the relay device.

The method can still further include attempting to ignite an engine of a tractor 10 connected to the trailer 15 and providing a warning responsive to the attempt to ignite the engine when at least one trailer door 17 is in an open position.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A combination trailer and apparatus for controlling power to interior functions of the trailer of a heavy duty vehicle, the combination comprising:

a vehicle trailer adapted to be connected to a heavy duty vehicle and having an interior cargo storage chamber and at least one trailer door for providing access to the interior cargo storage chamber;

a power supply connected to the trailer;

at least one light source connected to said power supply and mounted within the interior cargo storage chamber of said trailer; and a light controller mounted to the trailer, connected to said power supply and said at least one light source, and responsive to open and closed positions of the at least one door for controlling the power to said at least one light source during predetermined periods of time when said at least one trailer door is in a fully open position and a closed position so that when said at least one trailer door is in the open position said at least one light source is in an on position having power supplied thereto and when the at least one trailer door is in a closed position power is prevented from being supplied to said at least one light source and thereby cause said at least one light source to be in an off position said light controller includes a switching sensor and is mounted to a wall of said trailer, and wherein said at least one light source is in the on position when a portion of the at least one trailer door is positioned adjacent to said switching sensor and in the fully open position and wherein said at least one light source is in the off position when the portion of the at least one trailer door is positioned away from said switching sensor and in a closed position.

2. A combination as defined in claim 1, wherein said light controller is mounted to an interior side wall, an interior end wall, or an interior top wall of said trailer, and the combination further comprising at least one magnet mounted to an exterior of the at least one trailer door.

3. A combination as defined in claim 1, wherein said switching sensor of said light controller includes a relay device, and the combination further comprising the portion of the at least one trailer door initiating a magnetic field when positioned closely adjacent said relay device.

4. A combination as defined in claim 3, wherein said relay device comprises at least one of the following: either a reed switch, a Hall-effect device, or a magneto-resistive device, and the combination further comprising the at least one trailer door having a magnetic material which initiates the magnetic field positioned on the portion of the at least one trailer door such that said at least one light source is in the on position when the portion of the at least one trailer door is positioned adjacent said relay device and in the open position and such that said at least one light source is in the off position when the portion of the at least one trailer door is positioned away from said relay device and in a closed position.

5. A combination as defined in claim 1, wherein the open position of said at least one trailer door is a fully open position whereby the at least one trailer door is positioned closely adjacent a sidewall of the trailer.

6. A combination as defined in claim 1, wherein said at least one trailer door is in a fully open position whereby a lower portion of said at least one trailer door is positioned closely adjacent a top region of the trailer.

7. A combination as defined in claim 1, wherein said light controller includes a housing and a plurality of function indicators connected to said housing.

8. A combination apparatus as defined in claim 7, wherein said plurality of function indicators include a first function indicator for indicating the presence of power being supplied to said light controller and a second function indicator for indicating the position of said at least one trailer door.

9. A combination as defined in claim 1, further comprising a tractor coupled to said trailer, and wherein said power supply includes a power line associated with said trailer and connected to said tractor, and wherein said light controller is further connected to said power line associated with said trailer.

10. A combination as defined in claim 9, wherein said trailer also includes an automatic braking system, wherein the automatic braking system is also connected to said power line, and wherein said power line supplies about 12 volts to said light controller and said automatic braking system.

11. A combination as defined in claim 10, wherein said at least one light source comprises at least one trailer dome light positioned within the interior cargo storage chamber of the trailer.

12. A combination as defined in claim 11, further comprising at least one back up light connected to said trailer and to said light controller so that said light controller further controls power being supplied to said at least one back up light.

13. A combination as defined in claim 11, further comprising at least one back up alarm connected to said trailer and to said light controller to provide a warning when said trailer is being backed up in a reverse direction, and wherein said light controller further controls power being supplied to said at least one back up alarm.

14. A combination as defined in claim 10, wherein said power line includes a data communication device connected thereto for providing data communications along said power line as a data communications carrier.

15. A combination as defined in claim 9, further comprising an ignition switch associated with an attempt to ignite an engine of the tractor and a warning device connected to said ignition switch and said light controller for providing a warning when said ignition switch is activated and the at least one trailer door is in an open position.

16. A combination as defined in claim 15, wherein said ignition switch includes at least one of the following: a key switch, a key pad, a remote switch, or an ignition button, and wherein said warning device includes at least one of the following: a horn, a warning light, or a display indicator.

17. A combination as defined in claim 15, wherein said light controller comprises a first light controller, wherein said at least one trailer door comprises first and second trailer doors of said trailer.

18. A combination as defined in claim 17, further comprising at least a second light controller mounted to said trailer, connected to said ignition switch, said warning device, said first light controller, and said power supply, and responsive to open and closed positions of the second trailer door for providing a warning when the ignition switch is activated and the second trailer door is in an open position.

19. A combination trailer and apparatus for controlling power to interior functions of the trailer of a heavy duty vehicle, the combination comprising:

a vehicle trailer adapted to be connected to a heavy duty vehicle and having at least one trailer door for providing access to an interior chamber of said trailer;

power supplying means connected to the trailer for supplying power to trailer functions;

light illuminating means connected to said power supplying means for providing light illumination; and light power controlling means mounted to the trailer, connected to said power supplying means and said light illuminating means, and responsive to open and closed positions of said at least one trailer door for controlling the power to said light illuminating means during predetermined periods of time when said at least one trailer door is in a fully open position and a closed position so that when said at least one trailer door is in the fully open position said light illuminating means is in an on position having power supplied thereto and when the at least one trailer door is in a closed position power is prevented from being supplied to said light illuminating means and thereby cause said light illuminating means to be in an off position said light power controlling means includes a switching sensor and is mounted to a wall of said trailer, and wherein said light illuminating means is in the on position when a portion of the at least one trailer door is positioned adjacent to said switching sensor and in the fully open position and wherein said light illuminating means is in the off position when the portion of the at least one trailer door is positioned away from said switching sensor and in a closed position.

20. A combination as defined in claim 19, wherein said light power controlling means is mounted to an interior side wall, an interior end wall, or an interior top wall of said trailer, and the combination further comprising at least one magnet mounted to an exterior of the at least one trailer door.

21. A combination as defined in claim 20, wherein said switching sensor of said light controller includes a relay device, and the combination further comprising the portion of the at least one trailer door initiating a magnetic field when positioned closely adjacent said relay device.

22. A combination as defined in claim 21, wherein said relay device comprises at least one of the following: either a reed switch, a Hall-effect device, or a magneto-resistive device, and the combination further comprising the at least one trailer door having a magnetic material which initiates the magnetic field positioned on the portion of the at least one trailer door such that said light illuminating means is in the on position when the portion of the at least one trailer door is positioned adjacent said relay device and in the open position and such that said light illuminating means is in the off position when the portion of the at least one trailer door is positioned away from said relay device and in a closed position.

23. A combination as defined in claim 19, wherein the open position of said at least one trailer door is a fully open position whereby the at least one trailer door is positioned closely adjacent a sidewall of the trailer.

24. A combination as defined in claim 19, wherein said at least one trailer door is in a fully open position whereby a lower portion of said at least one trailer door is positioned closely adjacent a top region of the trailer.

25. A combination as defined in claim 22, wherein said light power controlling means includes a housing and a plurality of function indicators connected to said housing.

26. A combination apparatus as defined in claim 25, wherein said plurality of function indicators include a first function indicator for indicating the presence of power being supplied to said light controller and a second function indicator for indicating the position of said at least one trailer door.

27. A combination as defined in claim 19, further comprising a tractor coupled to said trailer, and wherein said power supplying means includes a power line associated with said trailer and connected to said tractor, and wherein said light controller is further connected to said power line associated with said trailer.

28. A combination as defined in claim 27, wherein said trailer also includes an automatic braking system, wherein the automatic braking system is also connected to said power line, and wherein said power line supplies about 12 volts to said light controller and said automatic braking system.

29. A combination as defined in claim 28, wherein said light illuminating means comprises at least one trailer dome light positioned within an interior chamber of the trailer.

30. A combination as defined in claim 29, further comprising at least one back up light connected to said trailer and to said light power controlling means so that said light power controlling means further controls power being supplied to said at least one back up light.

31. A combination as defined in claim 30, further comprising at least one back up alarm connected to said trailer and to said light power controlling means to provide a warning when said trailer is being backed up in a reverse direction, and wherein said light power controlling means further controls power being supplied to said at least one back up alarm.

32. A combination as defined in claim 29, wherein said power line includes a data communication device connected thereto for providing data communications along said power line as a data communications carrier.

33. A combination as defined in claim 29, further comprising an ignition switch associated with an attempt to ignite an engine of the tractor and a warning device connected to said ignition switch and said light power controlling means for providing a warning when said ignition switch is activated and the at least one trailer door is in an open position.

34. A combination as defined in claim 33, wherein said ignition switch includes at least one of the following: a key switch, a key pad, a remote switch, or an ignition button, and wherein said warning device includes at least one of the following: a horn, a warning light, or a display indicator.

35. A combination as defined in claim 34, wherein said light power controlling means comprises a first light controller, wherein said at least one trailer door comprises first and second trailer doors of said trailer.

36. A combination as defined in claim 35, further comprising at least a second light controller mounted to said trailer, connected to said ignition switch, said warning device, said first light controller, and said power supply, and responsive to open and closed positions of the second trailer door for providing a warning when the ignition switch is activated and the second trailer door is in an open position.

37. An apparatus for controlling power to interior functions of a trailer of a heavy duty vehicle, the apparatus comprising:
at least one light source connected to a power supply of a trailer; and
a light controller positioned to be mounted to a trailer, connected to the power supply of the trailer and the at least one light source, and responsive to open and closed positions of at least one door of the trailer for controlling the power to the at least one light source during predetermined periods of time when the at least one trailer door is in a fully open position and a closed position so that when the at least one trailer door is in the open position the at least one light source is in an on position having power supplied thereto and when the at least one trailer door is in a closed position power is prevented from being supplied to said at least one light source and thereby cause the at least one light source to be in an off position said light controller includes a switching sensor, and wherein said at least one light source is in the on position when a portion of the at least one trailer door is positioned adjacent to said switching sensor and in the fully open position and wherein said at least one light source is in the off position when the portion of the at least one trailer door is positioned away from said switching sensor and in a closed position.

38. An apparatus as defined in claim 37, wherein said light controller is positioned to be mounted to an interior side wall, an interior end wall, or an interior top wall of a trailer, and the apparatus further comprises at least one magnet positioned to be mounted to an exterior of the at least one trailer door.

39. An apparatus as defined in claim 37, wherein said switching sensor of said light controller includes a relay device, and the apparatus further comprising the portion of the at least one trailer door initiating a magnetic field when positioned closely adjacent said relay device.

40. An apparatus as defined in claim 39, wherein said relay device comprises at least one of the following: either a reed switch, a Hall-effect device, or a magneto-resistive device, and the apparatus further comprising the at least one trailer door having a magnetic material which initiates the magnetic field positioned on the portion of the at least one trailer door such that said at least one light source is in the on position when the portion of the at least one trailer door is positioned adjacent said relay device and in the open position and such that said at least one light source is in the off position when the portion of the at least one trailer door is positioned away from said relay device and in a closed position.

41. An apparatus as defined in claim 37, wherein the open position of said at least one trailer door is a fully open position whereby the at least one trailer door is positioned closely adjacent a sidewall of the trailer.

42. An apparatus as defined in claim 37, wherein said at least one trailer door is in a fully open position whereby a lower portion of said at least one trailer door is positioned closely adjacent a top region of the trailer.

43. An apparatus as defined in claim 37, wherein said light controller includes a housing and a plurality of function indicators connected to said housing.

44. An apparatus as defined in claim 43, wherein said plurality of function indicators include a first function indicator for indicating the presence of power being supplied to said light controller and a second function indicator for indicating the position of said at least one trailer door.

45. An apparatus as defined in claim 37, further comprising a power supply associated with a trailer and positioned to be connected to a tractor when coupled to the trailer, and wherein said light controller is further connected to said power line associated with the trailer.

46. An apparatus as defined in claim 45, wherein the trailer also includes an automatic braking system, wherein the automatic braking system is also connected to said power line, and wherein said power line supplies about 12 volts to said light controller and the automatic braking system.

47. An apparatus as defined in claim 46, wherein said at least one light source comprises at least one trailer dome light positioned within an interior chamber of the trailer.

48. A combination as defined in claim 47, further comprising at least one back up light connected to the trailer and to said light controller so that said light controller further controls power being supplied to said at least one back up light.

49. An apparatus as defined in claim 48, further comprising at least one back up alarm connected to the trailer and to said light controller to provide a warning when said trailer is being backed up in a reverse direction, and wherein said light controller further controls power being supplied to said at least one back up alarm.

50. An apparatus as defined in claim 47, wherein said power line includes a data communication device connected thereto for providing data communications along said power line as a data communications carrier.

51. An apparatus as defined in claim 46, further comprising an ignition switch associated with an attempt to ignite an engine of the tractor and a warning device connected to said ignition switch and said light controller for providing a warning when said ignition switch is activated and the at least one trailer door is in an open position.

52. An apparatus as defined in claim 51, wherein said ignition switch includes at least one of the following: a key switch, a key pad, a remote switch, or an ignition button, and wherein said warning device includes at least one of the following: a horn, a warning light, or a display indicator.

53. An apparatus as defined in claim 52, wherein said light controller comprises a first light controller, wherein the at least one trailer door comprises first and second trailer doors of the trailer.

54. An apparatus as defined in claim 53, further comprising at least a second light controller positioned to be mounted to the trailer, connected to said ignition switch, said warning device, said first light controller, and said power supply, and responsive to open and closed positions of the second trailer door for providing a warning when the ignition switch is activated and the second trailer door is in an open position.

55. A method for controlling power to a light source associated with a trailer of a heavy duty vehicle, the method comprising the steps of:
providing a vehicle trailer connected to a tractor and having at least one trailer door for providing access to an interior chamber of the trailer;
supplying power to a power line of the trailer;
providing at least one light source connected to the power line of the trailer; and
controlling the illumination of the at least one light source responsive to open and closed positions of the at least one trailer door during predetermined periods of time when the at least one trailer door is in an open position and a closed position so that when the at least one trailer door is in the fully open position the at least one light source is in an on position having power supplied thereto and when the at least one trailer door is in a closed position power is prevented from being supplied to the at least one light source and thereby cause the light source to be in an off position illuminating the at least one light source to the on position when a portion of the at least one trailer door is positioned adjacent to said switching sensor mounted to the trailer and in the fully open position and preventing power form being supplied to the at least one light source for the off position when the portion of the at least one trailer door is positioned away from said switching sensor and in a closed position.

56. A method as defined in claim 55, wherein the switching sensor is mounted to an interior side wall, an interior end wall, or an interior top wall of the trailer, and the method further comprises mounting at least one magnet to an exterior of the at least one trailer door.

57. A method as defined in claim 56, wherein the switching sensor includes a relay device, and the method further comprises initiating a magnetic field when a portion of the at least one trailer door is positioned adjacent the relay device.

58. A method as defined in claim 57, wherein the open position of the at least one trailer door is a fully open position whereby the at least one trailer door is positioned adjacent a sidewall of the trailer.

59. A method as defined in claim 57, wherein the at least one trailer door is in a fully open position whereby a lower portion of the at least one trailer door is positioned adjacent a top region of the trailer.

60. A method as defined in claim 55, further comprising attempting to ignite an engine of a tractor connected to the trailer and providing a warning responsive to the attempt to ignite the engine when the at least one trailer door is in an open position.

* * * * *